(12) United States Patent
Pickel et al.

(10) Patent No.: US 9,121,441 B2
(45) Date of Patent: Sep. 1, 2015

(54) BEARING ASSEMBLY FOR A SUPPORT ROLLER

(75) Inventors: Edgar Pickel, Sommerach (DE); Peter Horling, Schonungen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 517 days.

(21) Appl. No.: 13/263,631

(22) PCT Filed: Apr. 6, 2010

(86) PCT No.: PCT/EP2010/002148
§ 371 (c)(1),
(2), (4) Date: Nov. 10, 2011

(87) PCT Pub. No.: WO2010/115602
PCT Pub. Date: Oct. 14, 2010

(65) Prior Publication Data
US 2012/0045156 A1  Feb. 23, 2012

(30) Foreign Application Priority Data

Apr. 9, 2009  (DE) .......................... 10 2009 017 192

(51) Int. Cl.
*F16C 13/02* (2006.01)
*F16C 27/06* (2006.01)
(Continued)

(52) U.S. Cl.
CPC ............... *F16C 13/02* (2013.01); *B65G 39/09* (2013.01); *F16C 27/066* (2013.01); *F16C 35/07* (2013.01); *F16C 35/073* (2013.01); *F16C 35/077* (2013.01)

(58) Field of Classification Search
CPC .......... F16C 19/02; F16C 19/04; F16C 19/06; F16C 19/08; F16C 19/14; F16C 19/16; F16C 19/163; F16C 19/166; F16C 19/18; F16C 19/181; F16C 35/04; F16C 35/042; F16C 35/045; F16C 35/06; F16C 35/067; F16C 35/07; F16C 35/077; F16C 35/073; F16C 27/04; F16C 27/06; F16C 27/066; F16C 13/02; F16C 13/022; B65G 39/02; B65G 39/09; B65G 39/025
USPC .................... 384/535, 536, 581, 582; 193/37; 198/780–791
See application file for complete search history.

(56) References Cited

U.S. PATENT DOCUMENTS 1,669,952 A * 5/1928 Strong .......................... 384/480
3,362,760 A  6/1965 Sernetz
(Continued)

FOREIGN PATENT DOCUMENTS

AT  215887 B  6/1961
DE  1738837 U  1/1957
(Continued)

OTHER PUBLICATIONS

Machine Translation of DE 102007060968. Dated Jul. 17, 2008.*

*Primary Examiner* — Alan B Waits
(74) *Attorney, Agent, or Firm* — Bryan Peckjian; SKF USA Inc. Patent Dept.

(57) ABSTRACT

A bearing assembly comprises at least one bearing for rotatably supporting a support roller having at least one hollow cylindrical portion. A support element is disposed directly or indirectly between a ring of the at least one bearing and the support roller. The support element comprises first and second hollow-cylindrical segments extending in the axial direction of the support roller. The first and second hollow-cylindrical segments are connected by a ring-shaped segment extending either in the radial direction of the support roller or at an angle to the radial direction.

37 Claims, 2 Drawing Sheets

(51) Int. Cl.
*B65G 39/09* (2006.01)
*F16C 35/07* (2006.01)
*F16C 35/073* (2006.01)
*F16C 35/077* (2006.01)

(56) References Cited

U.S. PATENT DOCUMENTS

| | | | | |
|---|---|---|---|---|
| 3,255,858 | A | * | 6/1966 | Reilly .............................. 193/37 |
| 3,447,846 | A | * | 6/1969 | Marsh ............................ 384/536 |
| 3,841,721 | A | | 10/1974 | Coutant et al. |
| 3,961,829 | A | * | 6/1976 | Bowen et al. ................. 384/536 |
| 4,339,158 | A | | 7/1982 | Greener et al. |
| 4,722,618 | A | * | 2/1988 | Matsumoto et al. .......... 384/536 |
| 4,852,230 | A | * | 8/1989 | Yu .............................. 29/898.07 |
| 5,314,255 | A | * | 5/1994 | Schwerdt ...................... 384/536 |
| 5,383,549 | A | | 1/1995 | Mayer |
| 5,868,503 | A | * | 2/1999 | Bade ............................. 384/536 |
| 6,030,128 | A | * | 2/2000 | Pontzer ......................... 384/476 |
| 6,948,857 | B2 | * | 9/2005 | Schuetz ........................ 384/498 |
| 2003/0219183 | A1 | * | 11/2003 | Schuetz ........................ 384/495 |
| 2004/0108189 | A1 | * | 6/2004 | Itoh et al. ...................... 198/780 |
| 2005/0244221 | A1 | | 11/2005 | Seaman |
| 2008/0267550 | A1 | * | 10/2008 | Hirakawa et al. ............. 384/536 |

FOREIGN PATENT DOCUMENTS

| | | | |
|---|---|---|---|
| DE | 2400701 | A1 | 7/1974 |
| DE | 2801879 | A1 | 11/1978 |
| DE | 3238634 | A1 | 4/1984 |
| DE | 102007060968 | A1 | 7/2008 |
| DE | 102008013131 | A1 | 9/2009 |
| EP | 0298356 | A1 | 1/1989 |
| EP | 0639722 | A2 | 2/1995 |
| GB | 592043 | A1 | 9/1947 |
| GB | 1589904 | A | 5/1981 |
| JP | 01145916 | A * | 6/1989 ........... B65G 39/071 |
| WO | WO2007068595 | A1 | 6/2007 |

* cited by examiner

BEARING ASSEMBLY FOR A SUPPORT ROLLER

CROSS-REFERENCE

This application is the U.S. national stage of International Application No. PCT/EP2010/002148 filed on Apr. 6, 2010, which claims priority to German patent application no. 10 2009 017 192.4 filed on Apr. 9, 2009.

TECHNICAL FIELD

The invention relates to a bearing assembly for a support roller, which is formed in a hollow cylindrical manner at least in one segment thereof, having a bearing that bears the support roller, wherein a support element is disposed directly or indirectly between a ring of the bearing and the support roller.

RELATED ART

Diverse possibilities are known in the prior art for the bearing of support rollers. DE 1 738 837 U discloses a bearing assembly of the above-mentioned type. Such a solution is also known from GB 592 043 A. DE 28 01 879 A1 shows another similar bearing assembly, wherein an elastomeric intermediate layer is also utilized for the purpose of dampening the system. An axial end portion of a sleeve, which serves as a support element, radially enlarges and its radially outer portion is welded to the cylindrical inner surface of the support roller. Other bearing assemblies for the dampened bearing of a support roller are known from AT 215 887, DE 24 00 701 A1 and U.S. Pat. No. 3,362,760.

It is common in all of the solutions that a relatively high manufacturing expense must be incurred in order to produce the bearing assembly. In part, the manufacturing tolerances must be maintained as precise as possible in order to obtain a bearing assembly having a highly true running precision. Further, the rigidity of the design is also sometimes not sufficient, in particular when—as in DE 28 01 879 A1—radially-enlarged sleeve segments must be fixedly welded to the interior of the support roller.

It is disadvantageous that the support roller assemblies have a relatively high weight. As a result, the loads that must be borne by the bearing assembly are high. Further, it is disadvantageous that large loads can be transmitted into the bearing in case the axis of the bearing and the axis of the support bearing are improperly positioned—for example in case corresponding loads act on the support roller.

SUMMARY

One object of the present teachings is to improve a bearing assembly of the above-mentioned type so that it is possible to design the assembly in a substantially lighter manner without resulting in a significant reduction of stability. Further, a problem-free bearing operation should be ensured even if the axes of the bearing and the support roller are slightly out of alignment. In addition, this bearing assembly should be producible in a cost-effective manner. The tolerances required for the manufacturing should be allowed to be as large as possible without risking the production of defective parts.

In one aspect of the present teachings, a support element included in the bearing assembly includes two hollow-cylindrical segments extending in the axial direction of the support roller and/or the bearing, which hollow-cylindrical segments are connected by a ring-shaped segment that extends in the radial direction or at an angle (between 0° and 45°) to the radial direction.

Preferably, the hollow-cylindrical segments and the ring-shaped segment are designed as a one-piece component.

The extension of the ring-shaped segment in the axial direction is preferably at most 20%, particularly preferably at most 15%, of the extension of the hollow-cylindrical segment in the axial direction.

The ring-shaped segment can be disposed in the middle of the axial extension of the hollow-cylindrical segment.

The support element can be comprised of plastic, in particular polyamide; the manufacture of the support element from a light metal, in particular aluminum or magnesium, is also possible.

A radial circumferential surface of at least one hollow-cylindrical segment spaced from the ring-shaped segment can be formed conically starting from the axial position of the ring-shaped segment. In this case, an improved axial retention of the support element on the surrounding components is achieved. Preferably, it can be provided that the radius of the inner circumferential surface of the inner ring-shaped segment of the support element decreases in the direction away from the axial position of the ring-shaped segment.

In order to achieve sufficient stability in spite of the relatively light construction, planar bridges extending in the radial direction are preferably provided between the hollow-cylindrical segments. These bridges are preferably connected with the ring-shaped segment, wherein a particularly preferred embodiment provides a one-pieced embodiment of the ring-shaped segment and the bridges. The bridges can axially extend between the ring-shaped segment and the respective axial end portions of the support element. In a further embodiment, a plurality of bridges are disposed equal-distantly around the circumference of the hollow-cylindrical segments, for example 4 or 8 bridges, and further the plurality of bridges are disposed on both sides of the ring-shaped segment.

An intermediate ring can be disposed between the radially-inward-lying hollow-cylindrical segment of the support element and the ring of the bearing. This intermediate ring can have at least one rim axially surrounding the ring of the bearing. The intermediate ring can be made of metal, in particular steel or light metal.

Further, a dampening element made of elastomeric- or rubber material can be disposed between the radial-outward-lying hollow cylindrical segment of the support element and the support roller and/or between the radially-inward-lying hollow-cylindrical segment of the support element and the intermediate ring or the ring of the bearing.

The dampening layer is preferably made of an elastomer, in particular polyurethane, or is made of a rubber material.

The dampening element can have a hollow-cylindrical shape.

A sleeve can be disposed between the support roller and the dampening element. The sleeve can surround the dampening element by means of a ring segment that extends radially inwardly. Further, the sleeve can axially surround the support roller by means of a ring segment that extends radially outwardly. It can be made, e.g., from metal plate. A sealing element, in particular an O-ring, can be disposed between the support roller and the sleeve.

Between at least two of the components: ring of the bearing, intermediate ring, hollow-cylindrical segment of the support element, dampening element, sleeve and support roller, a friction-increasing medium can be applied or a coating made of a friction-increasing medium can be applied to at least one of the components.

For example and preferably, zinc can be utilized as the friction-increasing medium. Accordingly, a galvanized metal plate (for the sleeve), for example, can be provided in order to achieve the friction-increasing effect. The zinc layer also advantageously results in a corrosion protection in the joint. Further, a zinc layer can be applied in a very cost-effective manner.

The friction-increasing medium can also include diamond or boron nitride; in particular, it can include diamond paste. However, the friction-increasing medium can also include silicon carbide or corundum.

The diamond, boron nitride, silicon carbide or corundum preferably exists as grains having a diameter range between 1 μm and 100 μm, in particular having a diameter range between 10 μm and 80 μm.

It is also possible that the grain-shaped material (e.g., the diamonds, silicon carbide, corundum or boron nitride) is bonded to the mentioned components with a bonding agent. Preferably, a metallic layer is utilized as the bonding agent, in particular a layer of nickel. This can be applied by a galvanizing process.

In the alternative, the coating having the friction-increasing property can also be a molybdenum layer. Preferably, this can be applied by flame spraying.

The at least one bearing is preferably designed as a roller bearing.

The support roller can be formed as a pipe having a constant wall thickness that is respectively borne at both axial end portions by a bearing.

With the proposed solution, it results in an advantageous manner that a very light and nevertheless stable embodiment of the support roller assembly can be achieved.

Slight misalignments between the bearing and the support roller can be easily compensated by the support element in an advatnageous manner if it has in a double T-shape in axial cross-section.

The necessary components are formed very simply, which means that the manufacture of the bearing assembly can take place in a very economical manner.

The preferably-provided dampening layer made of elastomeric- or rubber material provides the rotational balancing and vibration decoupling. Further, transient loads can be better absorbed by it.

A further important advantage of the proposed solution is that, when the friction-increasing coating is utilized, the torque transmission can be substantially improved. The highest torques can be transmitted without leading to a detachment of the connection of the components. Furthermore, a slipping-through of components is excluded as much as possible. This becomes noticeable in an especially advantageous manner when rotational deviations occur during operation of the support roller, which can not develop any negative effects due to the selected design of the bearing assembly.

In other words, when the above-mentioned torque must be transmitted, a smaller or lighter conception of the bearing assembly is possible.

This result is achievable even with a relatively short press-fit between the associated components.

The proposed bearing assembly is preferably utilized in pit mining and in this case, it is an important component of a support roller device. Here, a high requirement for qualitatively high-valued and light bearing assemblies exists that distinguish themselves by a long service life and a comfortable operation.

Exemplary embodiments of the invention are illustrated in the drawings.

DETAILED DESCRIPTION OF THE INVENTION

Figure 1:
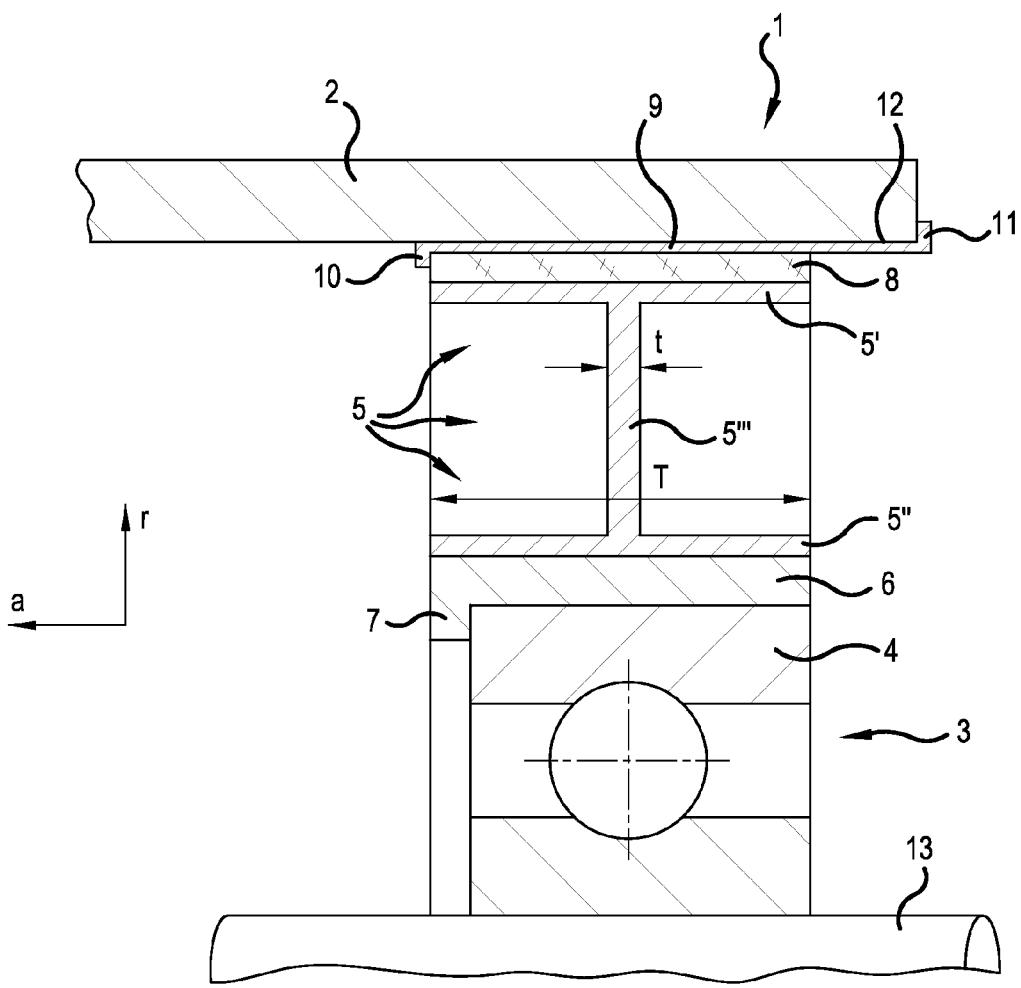
FIG. 1 shows the radial cross-section through a bearing assembly having a support roller that is borne by a bearing.

In FIG. 1, a bearing assembly 1 can be seen that serves to bear a support roller 2 of a conveying device. A shaft 13 is illustrated, on which a deep groove ball bearing 3 is fixed. The outer ring 4 of the deep groove ball bearing 3 supports an intermediate ring 6 that has a rim 7 on one side, which rim axially surrounds the outer ring 4 and forms an axial stop for it.

The support roller 2 is formed as a hollow-cylindrical component, i.e. as a pipe, wherein a bearing assembly 1 is disposed in both axial end portions, as can be seen in the Figure. A sleeve 9 is pressed into the inwardly-directed surface of the support roller 2 and sits in the support roller 2 with a press-fit. Between the sleeve 9 and the intermediate ring 6, a dampening element 8 made of elastomeric- or rubber material is disposed radially further outwardly and a support element 5 is disposed radially further inwardly.

In the present case, the dampening element 8 is designed as a hollow-cylindrical layer. The elastomeric- and/or rubber material can be directly connected with the sleeve 9 and/or with the support element 5 by an injection molding process or by a vulcanization process.

It is important that the support element 5 includes two hollow-cylindrical segments 5' and 5" extending in the axial direction a of the support roller 2 and/or the bearing 3, which segments 5' and 5" are connected by a ring-shaped segment 5''' extending in the radial direction r. It is also possible that the ring-shaped segment 5''' forms an angle (not illustrated) with the radial direction; this angle can be up to 45°.

Thus, the support element 5 has a double T-shaped design in the illustrated radial cross-section, which makes it possible that improper positionings between the axes of the support roller 2 and the bearing 3 can be elastically compensated by the elastic effect of the dampening element 8 without inducing large forces in the bearing.

This is achieved and/or fostered by making the extension t of the ring-shaped segment 5''' in the axial direction a at most 20%, preferably at most 10% to 15%, of the extension T of the hollow-cylindrical segments 5', 5" in the axial direction a.

It is advantageous that the sleeve 9 is disposed in at least one axial segment portion of the support roller 2 between the inner cylindrical surface of the support roller 2 and the dampening element 8; the sleeve 9 axially overhangs on one side and has a ring segment 11 extending radially outwardly at the axial end portion of the support roller 2. This ring segment 11 can also be called a flange and forms a defined axial stop for the support roller 2. An axial fixing of the support roller 2 relative to the sleeve 9 is thus possible in a simplified manner.

The support roller 2 and the sleeve 9 are thus fixedly connected with each other, which can be facilitated, e.g., by a weld. The sealing between the sleeve 9 and the support roller 2 can be produced by a seal element 12—in the exemplary embodiment in the shape of an O-ring.

On the other side, a ring segment 10 surrounds the dampening element 8 at the other axial end of the sleeve 9 and in this respect provides an axial stop for the dampening element 8.

Figure 2:
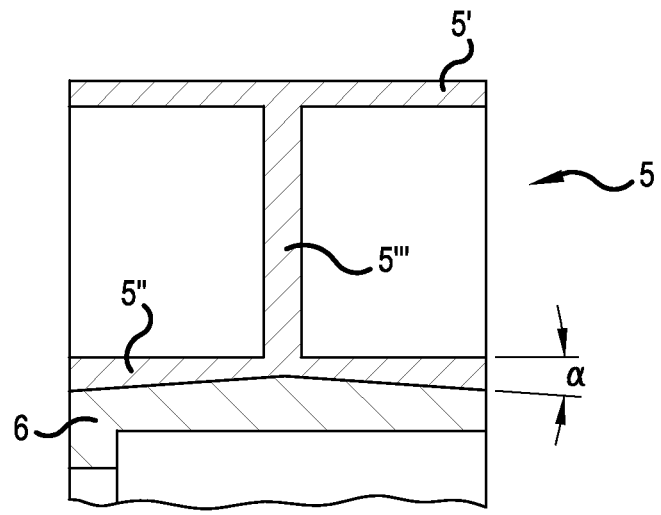
FIG. 2 shows the radial cross-section through a support element of the bearing assembly according to an alternative embodiment and FIG. 3 shows in perspective illustration the support element of the bearing assembly in another alternative embodiment.

In FIG. 2, it can be seen that it can also be provided for the support element 5 that the radial inner surface of the hollow-cylindrical segment 5" (and/or the radial outer surface of the hollow-cylindrical segment 5' —is not illustrated) can have a conical shape. In the present case, the radial inner surface of the hollow-cylindrical segment 5" extends on both sides of the middle, i.e. on both sides of the ring-shaped segment 5''', towards the axial ends of the hollow-cylindrical segment 5" in a radially conically sloping manner. The cone angle α is illustrated in an exaggerated manner here. In most cases, it is in the range of a few degrees, e.g., 1 to 5°. As a result of this, an improved axial retention exists between the support element 5 and the intermediate ring 6.

Figure 3:
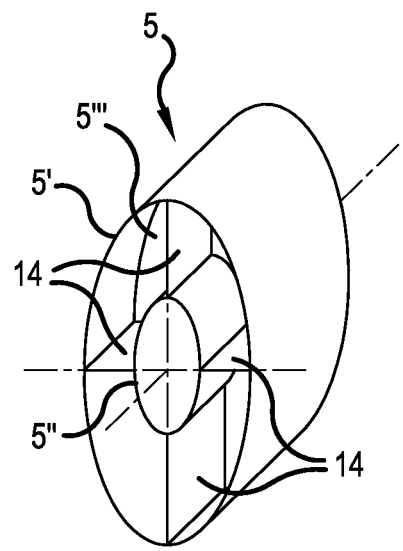

In FIG. 3, it is illustrated, by which measure a substantial stabilization increase of the support element 5 can be achieved, without having to accept the weight of a solid sleeve. Here, bridges 14 are provided on both sides of the ring-shaped segment 5''', the bridges 14 are designed as one-piece with the segments 5', 5", 5''' and the bridges 14 axially extend from the ring-shaped segment 5''' up to the axial ends of the segments 5', 5". In the exemplary embodiment, four bridges are provided (on each side of the ring-shaped segment 5''') that are disposed in an equal-distant distribution around the circumference.

REFERENCE NUMBER LIST

1 Bearing assembly
2 Support roller
3 Bearing (ball bearing)
4 Ring of the bearing (outer ring)
5 Support element
5' Hollow-cylindrical segment
5" Hollow-cylindrical segment
5''' Ring-shaped segment
6 Intermediate ring
7 Rim
8 Dampening element
9 Sleeve
10 Ring segment
11 Ring segment
12 Seal element (O-ring)
13 Shaft
14 Bridge
a Axial direction
r Radial direction
t Extension of the ring-shaped segment
T Extension of the hollow-cylindrical segment
A Angle

The invention claimed is:

1. An apparatus for rotatably supporting a support roller having at least one hollow cylindrical portion and extending in an axial direction, the apparatus comprising:
   at least one bearing configured to rotatably support the support roller,
   a support element configured to be disposed directly or indirectly between a ring of the at least one bearing and the support roller, wherein the support element comprises first and second hollow-cylindrical segments, each of the first and second hollow-cylindrical segments having first and second ends, the first and second hollow-cylindrical segments extending in the axial direction of the support roller, the first and second hollow-cylindrical segments being connected by a non-folded ring-shaped segment extending one of: (i) in a radial direction of the support roller and (ii) at an angle to the radial direction, the ring-shaped segment being connected to the first and second hollow-cylindrical segments at locations inward of the first and second ends of the first and second hollow-cylindrical segments to define two chambers between the first and second hollow-cylindrical segments, and
   an intermediate ring disposed between said ring and the first hollow-cylindrical segment, which is disposed radially inward of the second hollow-cylindrical segment,
   wherein the intermediate ring is formed from a material different than a material of the support element, and
   further comprising a dampening element made of an elastomeric material or a rubber material disposed at least one of: (i) between the second hollow-cylindrical segment and the support roller, and (ii) between the first hollow-cylindrical segment and the intermediate ring or the ring of the bearing,
   wherein the dampening element has a hollow-cylindrical shape, and
   further comprising a sleeve disposed between the support roller and the dampening element.

2. The apparatus according to claim 1, wherein the first and second hollow-cylindrical segments are integrally formed with the ring-shaped segment as a one-piece component.

3. The apparatus according to claim 1, wherein the ring-shaped segment has a length in the axial direction that is up to 20% of the length of the first and second hollow-cylindrical segments in the axial direction.

4. The apparatus according to claim 3, wherein the ring-shaped segment is disposed in the middle of the length of the first and second hollow-cylindrical segments in the axial direction.

5. The apparatus according to claim 1, wherein the support element comprises polyamide.

6. The apparatus according to claim 1, wherein the support element is made of aluminum or magnesium.

7. The apparatus according to claim 1, wherein at least one of the first and second hollow-cylindrical segments has a radially-inward circumferential surface that extends conically in the axial direction away from the ring-shaped segment.

8. The apparatus according to claim 7, wherein the radially-inward circumferential surface of the first hollow-cylindrical segment has a radius that decreases in the axial direction away from the ring-shaped segment.

9. The apparatus according to claim 1, further comprising at least one planar bridge extending at least substantially in the radial direction and connecting the first and second hollow-cylindrical segments.

10. The apparatus according to claim 9, wherein the at least one bridge is connected with the ring-shaped segment.

11. The apparatus according to claim 10, wherein the at least one bridge axially extends between the ring-shaped segment and each respective axial end portion of the support element.

12. The apparatus according to claim 10, wherein the at least one bridge comprises a plurality of bridges and wherein the plurality of bridges are disposed equal- distantly around the circumference of the first and second hollow-cylindrical segments.

13. The apparatus according to claim 1, wherein the intermediate ring has at least one rim partially overlying an axial end surface of the ring of the bearing.

14. The apparatus according to claim 13, wherein the intermediate ring is made of metal.

15. The apparatus according to claim 1, wherein the sleeve includes a radially-inwardly extending flange partially overlying at least a portion of an axial end surface of the dampening element.

16. The apparatus according to claim 15, wherein the sleeve includes a radially-outwardly extending flange partially overlying at least a portion an axial end surface of the support roller in.

17. The apparatus according to claim 16, wherein the sleeve is made from metal plate.

18. The apparatus according to claim 17, further comprising an O-ring disposed between the support roller and the sleeve.

19. The apparatus according to claim 1, wherein, between at least two of the following components: the ring of the bearing, the intermediate ring, the first and second hollow-cylindrical segments, the dampening element, and the sleeve and the support roller, a friction-increasing agent is applied or a coating made of a friction-increasing agent is applied to at least one of said components.

20. The apparatus according to claim 19, wherein the friction-increasing agent comprises zinc or diamond paste or boron nitride or silicon carbide or corundum.

21. The apparatus according to claim 1, wherein the at least one bearing is a roller bearing.

22. The apparatus according to claim 1, wherein the support roller is formed as a pipe having a constant wall thickness.

23. The apparatus according to claim 1, wherein the ring-shaped segment is substantially planar.

24. The apparatus according to claim 1, wherein the ring-shaped segment is substantially radially disposed.

25. The apparatus according to claim 1, wherein the at least one bearing includes at least one roller element bounded by first and second planes perpendicular to the axial direction and wherein the ring-shaped segment lies entirely between the first and second planes.

26. The apparatus according to claim 1, wherein the two chambers are right circular cylinders.

27. The apparatus according to claim 1, wherein the intermediate ring is not an integral part of said support element and is formed from a different material than said support element.

28. The apparatus according to claim 1 including the support roller, the support element being disposed directly or indirectly between the ring of the at least one bearing and the support roller.

29. The apparatus according to claim 1, wherein the intermediate ring has different dimensions than the hollow cylindrical segment.

30. The apparatus according to claim 29, wherein the intermediate ring is not an integral part of the support element.

31. The apparatus according to claim 1, wherein the two chambers are right circular cylinders.

32. An apparatus for rotatably supporting a support roller having at least one hollow cylindrical portion and an axis of rotation extending in an axial direction, the apparatus comprising:
at least one bearing configured to rotatably support the support roller and including at least one roller element bounded by first and second planes perpendicular to the axis of rotation,
a support element mounted directly or indirectly on a ring of the at least one bearing, the support element comprising first and second hollow-cylindrical segments, each of the first and second hollow-cylindrical segments having first and second ends, the first and second hollow-cylindrical segments extending in the axial direction of the support roller, the first and second hollow-cylindrical segments being connected by a ring-shaped segment connected to the first and second hollow-cylindrical segments at locations inward of the first and second ends of the first and second hollow-cylindrical segments and lying entirely between the first and second planes to define two chambers between the first and second hollow-cylindrical segments, and
an intermediate ring disposed between said ring and the first hollow-cylindrical segment, which is disposed radially inward of the second hollow-cylindrical segment,
wherein the intermediate ring is formed from a material different than a material of the suppor element and,
further comprising a dampening element made of an elastomeric material or a rubber material disposed at least one of: (i) between the second hollow-cylindrical segment and the support roller, and (ii) between the first hollow-cylindrical segment and the intermediate ring or the ring of the bearing,
wherein the dampening element has a hollow-cylindrical shape, and
further comprising a sleeve disposed between the support roller and the dampening element.

33. The apparatus according to claim 32, wherein the ring-shaped segment is substantially planar.

34. The apparatus according to claim 32, wherein the intermediate ring is not an integral part of said support element and is formed from a different material than said support element.

35. The apparatus according to claim 32 including the support roller, the support element being disposed directly or indirectly between the ring of the at least one bearing and the support roller.

36. The apparatus according to claim 32, wherein the intermediate ring has different dimensions than the hollow cylindrical segment.

37. The apparatus according to claim 36, wherein the intermediate ring is not an integral part of the support element.

* * * * *